United States Patent [19]
Yatsu et al.

[11] Patent Number: 5,892,675
[45] Date of Patent: Apr. 6, 1999

[54] AC CURRENT SOURCE CIRCUIT FOR CONVERTING DC VOLTAGE INTO AC CURRENT

[75] Inventors: Makoto Yatsu; Kazuo Kuroki, both of Tokyo, Japan

[73] Assignee: Fuji Electric Co., Ltd., Kawasaki, Japan

[21] Appl. No.: 866,485

[22] Filed: May 30, 1997

[30] Foreign Application Priority Data

May 31, 1996 [JP] Japan ................................. 8-137827

[51] Int. Cl.⁶ ......................... H02M 7/521; H02M 7/122
[52] U.S. Cl. ............................................. 363/136; 363/57
[58] Field of Search ............................... 363/56, 57, 58, 363/96, 98, 124, 132, 135, 136

[56] References Cited

U.S. PATENT DOCUMENTS

| | | | |
|---|---|---|---|
| 4,849,873 | 7/1989 | Vanderheist | 363/55 |
| 4,876,635 | 10/1989 | Park et al. | 363/17 |
| 5,260,607 | 11/1993 | Kinbara | 307/253 |
| 5,303,140 | 4/1994 | Shimizu | 363/132 |
| 5,710,698 | 1/1998 | Lai et al. | 363/56 |

*Primary Examiner*—Matthew Nguyen
*Attorney, Agent, or Firm*—Greer, Burns & Crain, Ltd.

[57] ABSTRACT

An AC current source circuit converts a DC input voltage into an AC output current, and comprises a chopper circuit for converting a DC input voltage into a chopper voltage; and an inverter for converting the chopper voltage into an output AC current of a predetermined frequency. The inverter comprises at least four switch elements, and clamp-type snubber circuits corresponding to each of the switch elements are provided. The snubber circuit releases electric charges to the input terminal of the DC input voltage of the chopper circuit. The chopper circuit is connected to the inverter through a DC reactor. The DC input voltage is converted into a DC current by the chopper circuit and the DC reactor and transmitted to the inverter.

14 Claims, 9 Drawing Sheets

AC CURRENT SOURCE CIRCUIT FOR CONVERTING DC VOLTAGE INTO AC CURRENT

BACKGROUND OF THE INVENTION

1. Field of the Invention

The present invention relates to an AC current source circuit for providing a high-frequency AC current for a capacitive load such as an ozone generator, and more specifically to an AC current source circuit for converting a DC input voltage into a DC current by a chopper circuit and a direct current (DC) reactor, and converting the DC current into an AC output current by a semiconductor current-fed inverter.

2. Description of the Related Art

FIG. 1 shows the configuration of a conventional AC current source circuit. Described below are the configuration and operation of the circuit.

In FIG. 1, a 3-phase AC voltage generated by a 3-phase AC current power source 1 is converted into a DC current by a thyristor rectifier 2 and a direct current (DC) reactor (DCL) 3. The DC current is converted into an AC current of a rectangular waveform through a current-fed inverter (thyristor inverter) 4, and provided to a capacitive load 5, which is represented by a parallel circuit of a capacitor and a resistor.

In FIG. 1, a through f are thyristors which form a thyristor rectifier 2, and 6 through 9 are thyristors which form a current-fed (current-type) inverter 4. 10 through 13 are snubber circuits each of which is obtained by connecting a resistor and a capacitor in series. The snubber circuits 10 through 13 are connected to the thyristors 6 through 9 respectively in parallel.

For example, when the current flows through the thyristor rectifier 2, DCL 3, thyristor 6, capacitive load 5, thyristor 9, and back to the thyristor rectifier 2 in the polarity inverting operation for an output current by the current-fed inverter 4, if the thyristors 7 and 8 are turned on, the thyristors 6 through 9 all indicate conduction state because the load 5 is capacitive.

Thereafter, the thyristors 6 through 9 are turned off by the charged voltage of the capacitive load 5.

As a result, the current flows through the thyristor rectifier 2, DCL 3, thyristor 8, capacitive load 5, thyristor 7, and back to the thyristor rectifier 2, thereby inverting the polarity of the output current. A similar operation is performed in the opposite polarity inverting operation.

The snubber circuits 10 through 13 are connected to the thyristors 6 through 9 respectively in parallel in order to protect each of the thyristors 6 through 9 from the surge voltage generated when the thyristors 6 through 9 turn off.

The conventional device shown in FIG. 1 includes charge/discharge type RC snubber circuits, each of which comprises a series circuit of a resistor and a capacitor, as the snubber circuits 10 through 13 for protecting semiconductor elements for an inverter, that is, the thyristors 6 through 9.

When the resistance value of the resistor is Rs and the capacitance of the capacitor is Cs in each of the snubber circuits 10 through 13, the generation loss in each of the snubber circuits 10 through 13 is equal to or larger than $Cs \times Vop^2 \times f$ (Vop indicates a peak value of the output load voltage, and f indicates the output frequency).

Since this loss increases when the source circuit is used for a device which requires a high frequency or a high output load voltage, a large snubber circuit is required, which makes it difficult to make the entire system small, light in weight, with high efficiency, and less expensive.

Furthermore, since a DC current power source is prepared using the thyristor rectifier 2 which is switched at a frequency of the commercial power supply according to the conventional circuit shown in FIG. 1, a low-frequency ripple voltage on a cycle 6 times as long as the frequency for commercial power supply is applied to the DCL 3. Therefore, the DCL 3 has been required to have a large capacity.

SUMMARY OF THE INVENTION

The present invention has been developed to solve the various problems of the above described snubber circuits and DC current power source, and aims at making a smaller snubber circuit having a small capacity, and providing an AC current source circuit which is small, light in weight, efficient, and less expensive.

Another object of the present invention is to provide an AC current source circuit whose DC reactor is small in size and light in weight.

A further object of the present invention is to provide an AC current source circuit for suppressing the generation of a beat frequency in an output current.

The AC current source circuit according to the present invention includes a chopper circuit for converting a DC input voltage into a chopper voltage, an inverter including at least four switch elements, for generating an output AC current having a predetermined frequency based on the chopper voltage, and clamping snubber circuits each corresponding to the switch elements. The snubber circuits release or discharge electric charges or voltages to the input terminals of the DC input voltage of the chopper circuit.

The chopper circuit may include two unit chopper circuits connected in series between input terminals for the DC input voltage of the chopper circuit. Each of the two unit chopper circuits may include a capacitor and a switch element connected to the capacitor in parallel, and the two capacitors may be connected in series between the input terminals of the DC input voltage.

The chopper circuit and the inverter are connected through a DC reactor (or a coil), and the DC input voltage is converted into a DC current by the chopper circuit and the DC reactor.

The inverter can be an n-phase full-bridge semiconductor current-fed (current-type) inverter having 2×n (n indicates an integer equal to or larger than 2) semiconductor switch elements, and can convert the DC current from the DC reactor into an AC current of a rectangular-like waveform.

Each of the switch elements can be a reverse blocking type semiconductor switch element, which can resist a voltage in the reverse direction and can be provided for each of the arms of the inverter. In this case, each of the snubber circuits is formed by a parallel circuit of a full-bridge diode rectifier and a snubber capacitor. The ends of the snubber capacitor are connected to the input terminals of the DC input voltage of the chopper circuit through a snubber resistor or a snubber reactor.

Otherwise, in this case, each of the snubber circuits can be formed by a series circuit of a snubber diode, a snubber capacitor, and a snubber diode. At this time, both ends of the snubber capacitor are connected to the input terminals of the DC input voltage of the chopper circuit through a snubber resistor or a snubber reactor.

Each of the switch elements can be formed by a series circuit of a semiconductor rectifier (rectification) element (ex. diode) and a self-commutation (self-turn off) type semiconductor switch element, and can be provided for each of the arms of the inverter. In this case, each of the snubber circuits includes the first, second, and third snubber diodes and a snubber capacitor. The connection point of the semiconductor rectifier element and the self-commutation type semiconductor switch element is connected to one end of the snubber capacitor through the first snubber diode, and the other end of the snubber capacitor is connected to both ends of the series circuit through the second and third snubber diodes. Furthermore, the ends of the snubber capacitor are connected to the input terminals of the DC input voltage of the chopper circuit through a snubber resistor or a snubber reactor.

Otherwise, in this case, each of the snubber circuits can include a series circuit of a snubber diode, a snubber capacitor, and a snubber diode, and the series circuit can be connected in parallel with the semiconductor rectifier element. Furthermore, each of the snubber circuits can include a series circuit, connected in parallel with the two self-commutation type semiconductor switch elements in the inverter, comprised of a snubber diode, a snubber capacitor, and a snubber diode; and a series circuit, connected in parallel with another two self-commutation type semiconductor switch elements in the inverter, comprised of a snubber diode, a snubber capacitor, and a snubber diode. At this time, the ends of each snubber capacitor of the snubber circuit are connected to the input terminals of the DC input voltage of the chopper circuit through a snubber resistor or a snubber reactor.

Otherwise, the snubber circuit can include a series circuit, connected in parallel with two self-commutation type semiconductor switch elements in the inverter, comprised of a snubber diode, a snubber capacitor, and a snubber diode; and a series circuit, connected in parallel with the other two self-commutation type semiconductor switch elements in the inverter, comprised of a snubber diode, a snubber capacitor, and a snubber diode. At this time, the ends of each snubber capacitor of the snubber circuit are connected to the input terminals of the DC input voltage of the chopper circuit through a snubber resistor or a snubber reactor.

Additionally, an energy regenerative diode for the DC reactor can be provided between the positive side input terminal of the DC input voltage of the chopper circuit and the positive side input terminal of the inverter, and between the negative side input terminal of the DC input voltage of the chopper circuit and the negative side input terminal of the inverter.

The switching frequency of the chopper circuit can be synchronized with the output frequency of the inverter, and can be double the output frequency of the inverter.

Furthermore, the switching timing from the power mode to the free-wheeling mode in the chopper circuit can be synchronized with the timing of commutation in the inverter.

The DC reactor can include a reactor with two windings or coils having a common iron core.

An AC current source according to the present invention is for converting a DC input voltage into an AC output current, and comprises a chopper unit for converting the DC input voltage into a chopper voltage; a reactor unit (or a coil unit) for generating a DC current based on the chopper voltage; an inverter unit comprising a switching unit for converting the DC current from the reactor unit into the AC output current; and a snubber unit of a clamp-type corresponding to the switching unit. The charge stored in the snubber unit is released or discharged to an input terminal of the DC input voltage of said chopper unit.

According to the AC current source circuit and the AC current source of the present invention as described above, AC currents having a high frequency in the kHz order and a high power can be supplied to a capacitive load such as a discharge tube. Accordingly, the AC current source circuit and the AC current source of the present invention are superior as a current source for an ozone generator, which requires high frequency AC currents and high power. Further, the AC current source circuit and the AC current source is effective as a current source with a low loss for a discharge tube which requires an AC current of more than 1 kHz, and superior particularly as a current source for a discharge tube which requires AC currents with frequencies more than 1.5 kHz or 2 kHz, for which the conventional AC current source is difficult to be applied.

DESCRIPTION OF THE PREFERRED EMBODIMENT

The embodiment of the AC current source circuit according to the present invention is described by referring to the attached drawings.

Figure 1:
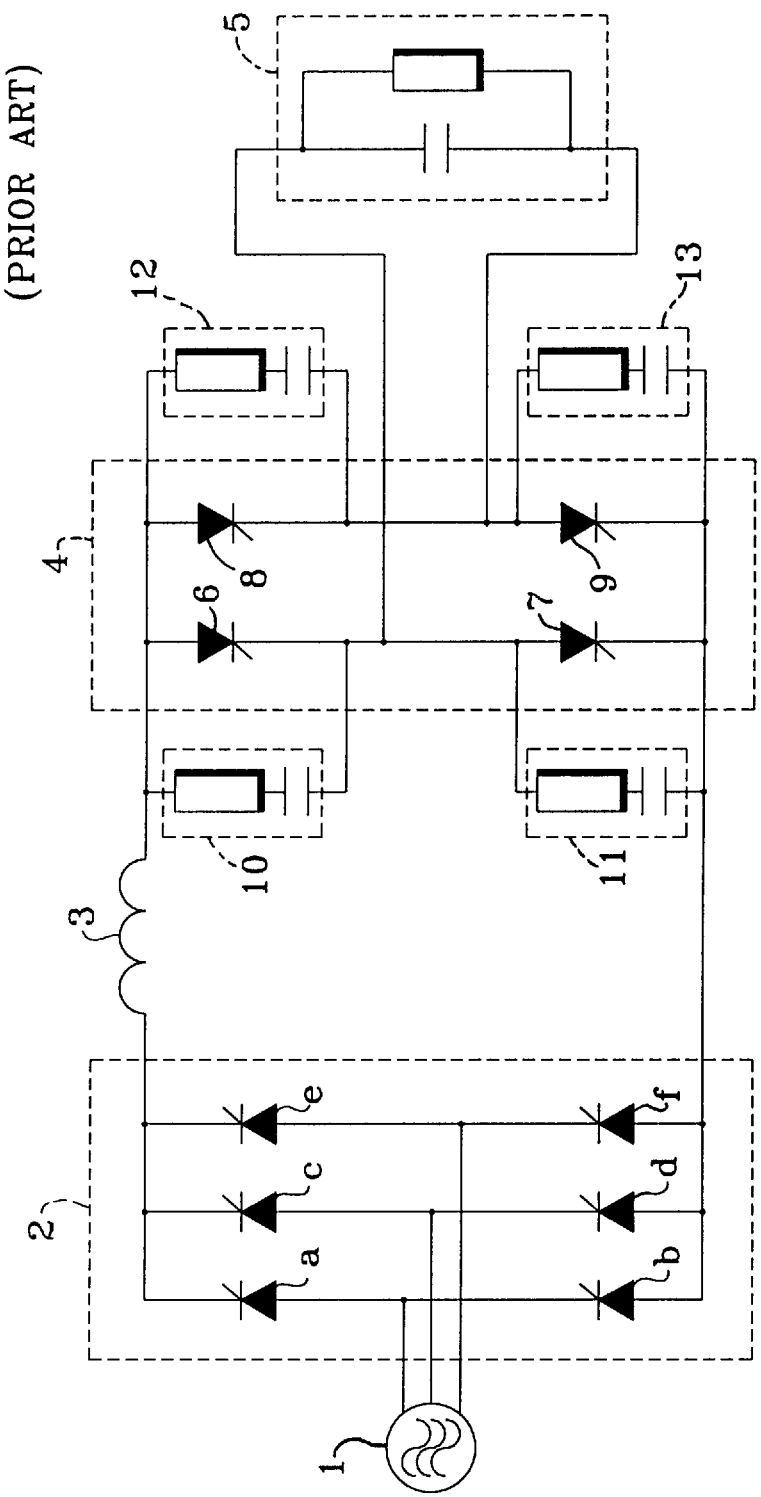
FIG. 1 shows the conventional AC current source circuit.
Figure 2:
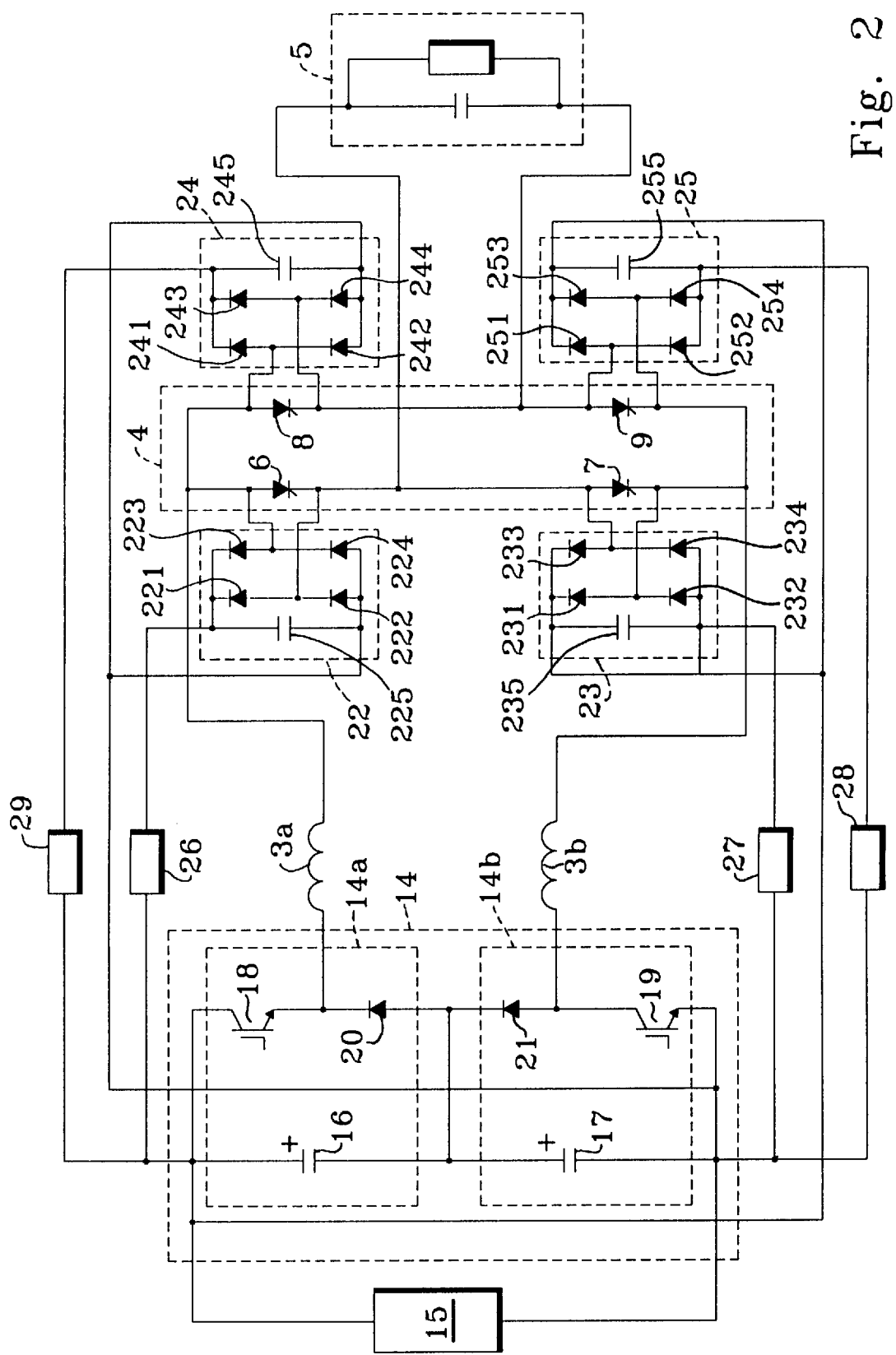
FIG. 2 shows the first embodiment of the AC current source circuit according to the present invention.

FIG. 2 shows the first embodiment of the AC current source circuit according to the present invention. The same units as shown in FIG. 1 are assigned the same reference numbers in FIG. 2.

This AC current source circuit is for converting a voltage generated by a direct current power source 15 into an AC current which is to be provided for the capacitive load 5, such as an ozone generator pipe, and comprises a chopper circuit 14; the DC (direct current) reactors (DCLs) 3a and 3b; the current-type (current-fed) inverter 4; full-bridge rectifier type clamping snubber circuits 22 through 25; and resistors 26 through 29.

The DC power source 15 is connected to the DC input terminals of the chopper circuit 14. The DC output terminals of the chopper circuit 14 are connected to the direct current input terminals of the current-fed inverter 4 through the DCLs 3a and 3b of the same current capacity. The AC current output terminals of the current-fed inverter 4 are connected to either end of the capacitive load 5.

The DC power source 15 can be a device which converts an AC current, such as a commercial power supply current, into a DC current using, for example, a PWM (pulse-width modulation) converter.

The current-fed inverter 4 is an n-phase full-bridge structure having 2×n (n indicates an integer equal to or larger than 2) semiconductor switches. This holds true with all other embodiments of the present invention.

The chopper circuit 14 comprises unit choppers 14a and 14b connected directly. The unit chopper 14a comprises a capacitor 16, an insulated gate bi-polar transistor (IGBT) 18, and a diode 20. The unit chopper 14b also comprises a capacitor 17, an IGBT 19, and a diode 21. The capacitors 16 and 17 have the same capacitance, and the connection point between them is connected to the serial connection point between the diodes 20 and 21.

The semiconductor switch element of the chopper circuit 14 can be an element other than an IGBT.

The full-bridge rectifier type clamping snubber circuits 22 through 25 are connected in parallel with the thyristors 6 through 9, as reverse blocking type semiconductor switch elements, which can resist reverse direction voltages, forming the current-fed inverter 4. The snubber circuit 22 is formed by a parallel connection of a diode bridge comprising diodes 221 through 224 forming a full-bridge diode rectifier, and a capacitor 225.

The other snubber circuits 23 through 25 comprise the diodes 231 through 234 and capacitor 235, diodes 241 through 244 and capacitor 245, and diodes 251 through 254 and capacitor 255, respectively.

Two input terminals of the full-bridge diode rectifier (single phase full-bridge rectifier) of each of the snubber circuits 22 through 25 are connected to the anode and cathode of each of the thyristors 6 through 9.

One end of the capacitor 225 of the snubber circuit 22 is connected to the anode of the capacitor 16 through the snubber resistor 26, and the other end is connected to the cathode of the capacitor 17. One end of the capacitor 245 of the snubber circuit 24 is connected to the anode of the capacitor 16 through the resistor 29, and the other end is connected to the cathode of the capacitor 17. One end of the capacitor 235 of the snubber circuit 23 is connected to the anode of the capacitor 16 and the other end is connected to the cathode of the capacitor 17 through the resistor 27. One end of the capacitor 255 of the snubber circuit 25 is connected to the anode of the capacitor 16 and the other end is connected to the cathode of the capacitor 17 through the resistor 28.

Described below are the operations of the present embodiment.

According to the present embodiment, the positive and negative side output terminals of the chopper circuit 14 are connected to the direct current input terminals of the current-fed inverter 4 through the two separate DCLs 3a and 3b. Thus, when the IGBTs 18 and 19 in the unit choppers 14a and 14b are turned on/off, the current in the free-wheeling mode when the IGBTs 18 and 19 are turned off flows through the DCL 3b, diode 21, diode 20, DCL 3a, current-fed inverter 4, and back to the DCL 3b. Therefore, the voltage of the two DC output terminals of the chopper circuit 14 is clamped to the voltage at the neutral point which is split by the capacitors 16 and 17.

With such a circuit configuration, if the value of the amplitude of the voltage generated at both ends of the capacitive load 5 is controlled to be smaller than the value of the voltage of the DC power source 15, then the steady potential (potential without consideration of a switching surge) at each point of the thyristors 6 through 9 of the current-fed inverter 4 is within the range of the voltage provided from the DC power source 15.

Therefore, to protect the thyristors 6 through 9 from the switching surge, full-bridge rectifier type clamping snubber circuits 22 through 25 are connected to the thyristors 6 through 9 respectively in parallel, and the destination or output of the clamp (where the electric charge is released or discharged) can be the DC power source 15, that is, the DC input unit of the system.

The feature of the clamping snubber circuits 22 through 25 is that they can protect semiconductor elements without generating an unnecessary charge/discharge loss, when compared with the RC snubber circuit for charge/discharge shown in FIG. 1. Therefore, according to the present embodiment, the size and capacity of the snubber circuits 22 through 25 can be small, thereby successfully realizing a smaller, lighter, and less-expensive system.

Figure 3:
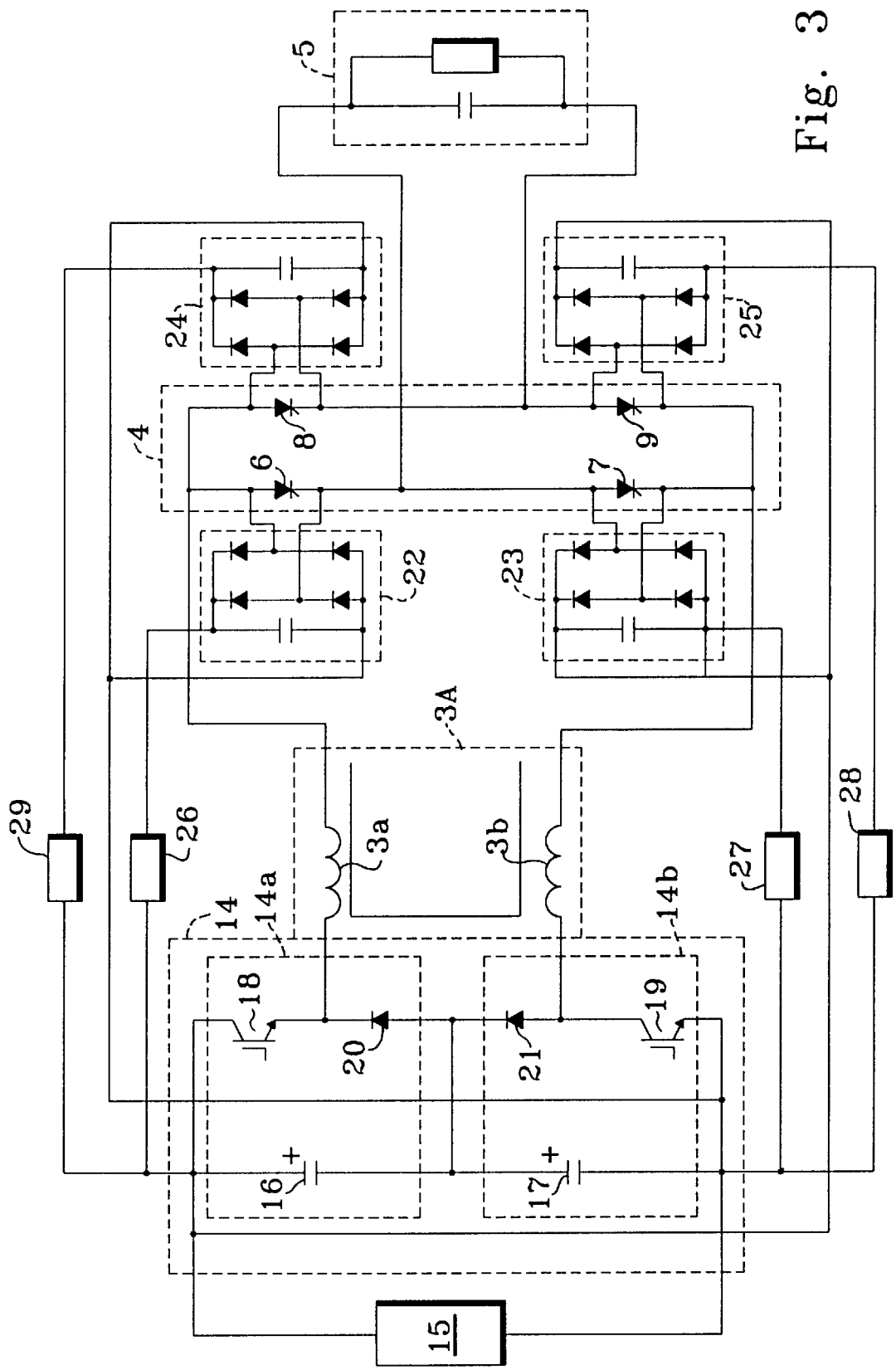
FIG. 3 shows the second embodiment of the AC current source circuit according to the present invention.

FIG. 3 shows the second embodiment of the AC current source circuit according to the present invention. The same components as the first embodiment are assigned the same reference numbers, and the detailed explanation is omitted here. With all other embodiments, the same components are assigned the same reference numbers and the detailed explanation is omitted.

The difference of the second embodiment from the first embodiment shown in FIG. 2 is that a DCL 3A having two windings or coils using a common iron core corresponding to the DCLs 3a and 3b is adopted instead of the individual reactors DCLs 3a and 3b as shown in FIG. 2. Other components and operations are the same as the first embodiment, and the detailed descriptions are omitted here.

According to the second embodiment, the DCL 3A using a common iron core can realize a smaller, lighter weight, and less-expensive DC reactor.

The feature of second embodiment is applicable to other embodiments described below.

Figure 4:
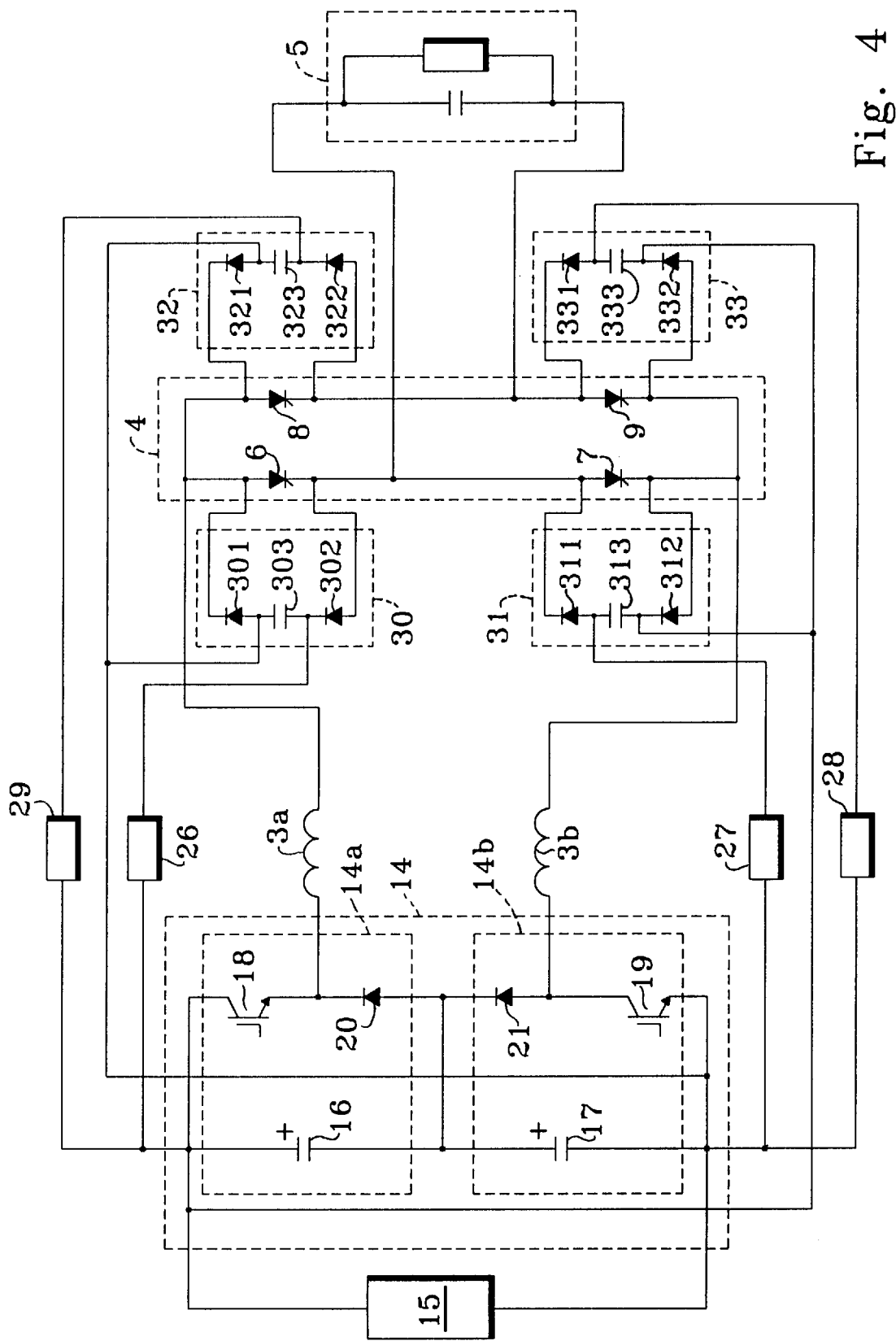
FIG. 4 shows the third embodiment of the AC current source circuit according to the present invention.

FIG. 4 shows the third embodiment of the AC current source circuit according to the present invention.

The difference of the third embodiment from the first embodiment is that half-bridge rectifier type clamping snubber circuits 30 through 33, each of which is formed by a series circuit of a diode, a capacitor, and a diode, are connected in parallel with the thyristors 6 through 9, in the third embodiment. In the first embodiment, the full-bridge rectifier type clamping snubber circuits 22 through 25 are used as the snubber circuits for the thyristors 6 through 9.

In each of the snubber circuits 30 through 33, 301, 302, 311, 312, 321, 322, 331, and 332 are diodes. 303, 313, 323, and 333 are capacitors.

The ends of each of the capacitors 303, 313, 323, and 333 are connected to the anode of the capacitor 16 and the cathode of the capacitor 17 through the resistors 26 through 29, as shown in FIG. 4.

Since the snubber capacitor is sandwiched by two diodes in these snubber circuits 30 through 33, the clamping to the DC power source 15 can be performed through the snubber circuits 30 through 33 for the potential change in each unit of the current-fed inverter 4 during the normal operation.

Figure 5:
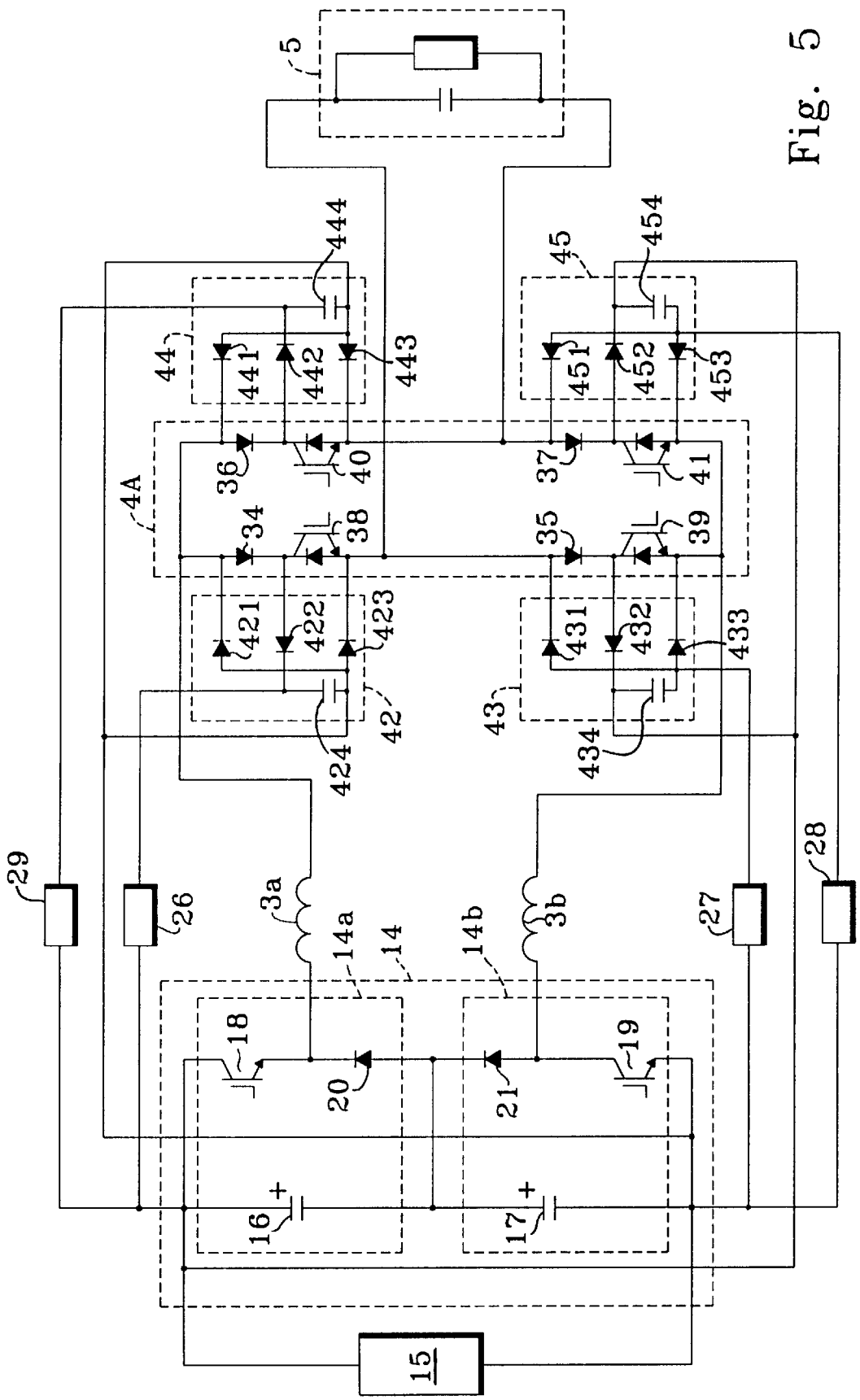
FIG. 5 shows the fourth embodiment of the AC current source circuit according to the present invention.

FIG. 5 shows the fourth embodiment of the AC current source circuit according to the present invention.

The difference of the fourth embodiment from the first embodiment is that, in the current-fed inverter 4A, the thyristors 6 thorough 9 shown in FIG. 2 are replaced with the series circuits of the diode 34, which is a semiconductor rectifier element, and an IGBT 38, which is a self-commutation type semiconductor switch element (an element capable of cutting or switching current by itself); a diode 35 and an IGBT 39; a diode 36 and an IGBT 40; and a diode 37 and an IGBT 41, as semiconductor switch elements forming respective arms of the inverter 4A. Another difference is that clamping snubber circuits 42 through 45, each of which comprises three diodes and a capacitor, are used for each of the arms of the inverter 4A.

In the fourth embodiment of the present invention, the snubber circuit 42 comprises diodes 421 through 423 and a capacitor 424, the snubber circuit 43 comprises diodes 431 through 433 and a capacitor 434, the snubber circuit 44 comprises diodes 441 through 443 and a capacitor 444, and the snubber circuit 45 comprises diodes 451 through 453 and a capacitor 454.

The connection of each snubber circuit is explained by referring to the snubber circuit 42 as an example.

The cathodes of the diodes 421 and 423, of which the respective anodes are connected, are connected to both ends of the series circuit of a diode 34 and the IGBT 38. The anode of the diode 422 is connected to the connection point between the diode 34 and the IGBT 38. The capacitor 424 is connected between the cathode of the diode 422 and the anodes of the diodes 421 and 423. One end of the capacitor 424 is connected to the anode of the capacitor 16 through the resistor 26, and the other end is connected to the cathode of the capacitor 17.

The other snubber circuits 43 through 45 are similarly connected. In the snubber circuit 43, one end of the capacitor 434 is connected to the anode of the capacitor 16 and the other end is connected to the cathode of the capacitor 17 through the resistor 27. In the snubber circuit 44, one end of the capacitor 444 is connected to the anode of the capacitor 16 through the resistor 29, and the other end is connected to the cathode of the capacitor 17. In the snubber circuit 45, one end of the capacitor 454 is connected to the anode of the capacitor 16 and the other end is connected to the cathode of the capacitor 17 through the resistor 28.

If a thyristor is used as a semiconductor switch element as in the current-fed inverter 4 according to the first embodiment shown in FIG. 2, the switching function of the thyristor generally limits a high-frequency output to 2 or 3 kHz, or lower. However, according to the fourth embodiment of the present invention, a high output frequency (2 or 3 kHz, or higher) can be obtained using the IGBTs 38 through 41 having a high frequency switching capability as semiconductor switch elements of the current-fed inverter 4A.

However, since a self-commutation type semiconductor element such as an IGBT for realizing a high-speed switching is normally poor in resisting reverse direction voltage, a switch for one arm of the inverter is designed by inversely connecting the blocking diodes 34 through 37 to the IGBTs 38 through 41 in series in order to increase the resistance against reverse voltages. At this time, since the snubber circuits 42 through 45 should protect the blocking diodes 34 through 37 and the IGBTs 38 through 41, both ends of each of the series circuits of the blocking diode and the IGBT, and each of the connection points between the blocking diode and the IGBT, are connected to the direct current power source 15 through respective diodes.

According to the present embodiment, as the snubber circuits 30 through 33 according to the third embodiment of the present invention shown in FIG. 4, a snubber circuit comprising a capacitor and diodes connected to both ends of the capacitor can be connected to each of the blocking diodes 34 through 37 as well as to each of the IGBTs 38 through 41. In this case, a total of eight snubber circuits are used for protecting the blocking diodes 34 through 37 and the IGBTs 38 through 41. However, with the configuration according to the fourth embodiment as shown in FIG. 5, the number of units used in the snubber circuit can be decreased thereby realizing a lower cost system.

Figure 6:
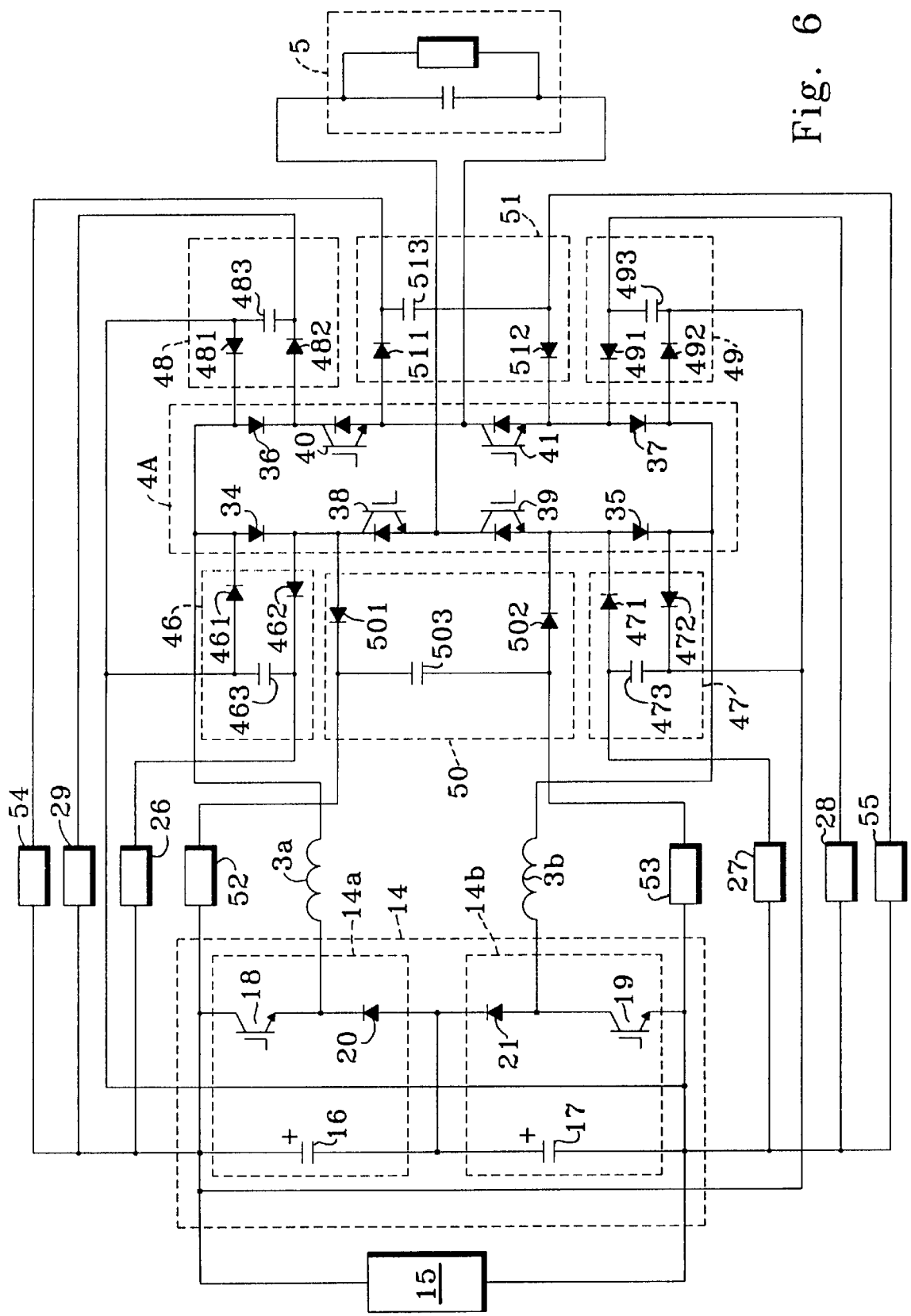
FIG. 6 shows the fifth embodiment of the AC current source circuit according to the present invention.

FIG. 6 shows the fifth embodiment of the AC current source circuit according to the present invention.

The difference of the fifth embodiment from the fourth embodiment is that the order of the connection in the series circuit of the blocking diodes 34 through 37 and the IGBTs 38 through 41 in the arms has been changed in the current-fed inverter 4A. Furthermore, the configuration of the snubber circuits 46 through 51 has been changed and the resistors 52 through 55 are added.

The commonly marketed IGBTs of operating voltages 600 V or 1200 V and having current ratings from several tens of Amperes to several hundreds of Amperes, are sold as a '2 in 1 (dual)' package for general purposes. Therefore, the IGBTs of the arms are moved and collected at the alternating current output terminal end of the current-fed inverter 4A as shown in FIG. 6, and the general-purpose '2 in 1' packages can be used for the IGBTs 38 and 39 and the IGBTs 40 and 41. This makes the total cost lower than in the case where the IGBTs are individually purchased.

Further use of the '2 in 1' package allows the IGBTs to be easily applied to the system in package units. In this embodiment, one '2 in 1' package is used for the IGBTs 38 and 39, and another '2 in 1' package is used for the IGBTs 40 and 41, to which the snubber circuits 50 and 51 are connected, respectively.

In the snubber circuits 50 and 51, 501, 502, 511, and 512 are diodes, and 503 and 513 are capacitors. Further, 52 through 55 are resistors connected between the ends of the capacitors 503 and 513 and the anode of the capacitor 16 and the cathode of the capacitor 17.

46 through 49 are snubber circuits connected in parallel with the diodes 34 through 37, respectively. 461, 462, 471, 472, 481, 482, 491, and 492 are diodes. 463, 473, 483, and 493 are capacitors.

Although not shown in FIG. 6, the IGBTs 38 through 41 and the blocking diodes 34 through 37 can be rearranged so that the diodes 34 through 37 are moved and collected at the AC current output terminal end of the current-fed inverter 4A. In this case, the '2 in 1' packages can be applied to pairs of these blocking diodes 34 through 37, and this configuration produces the same operating effect.

Figure 7:
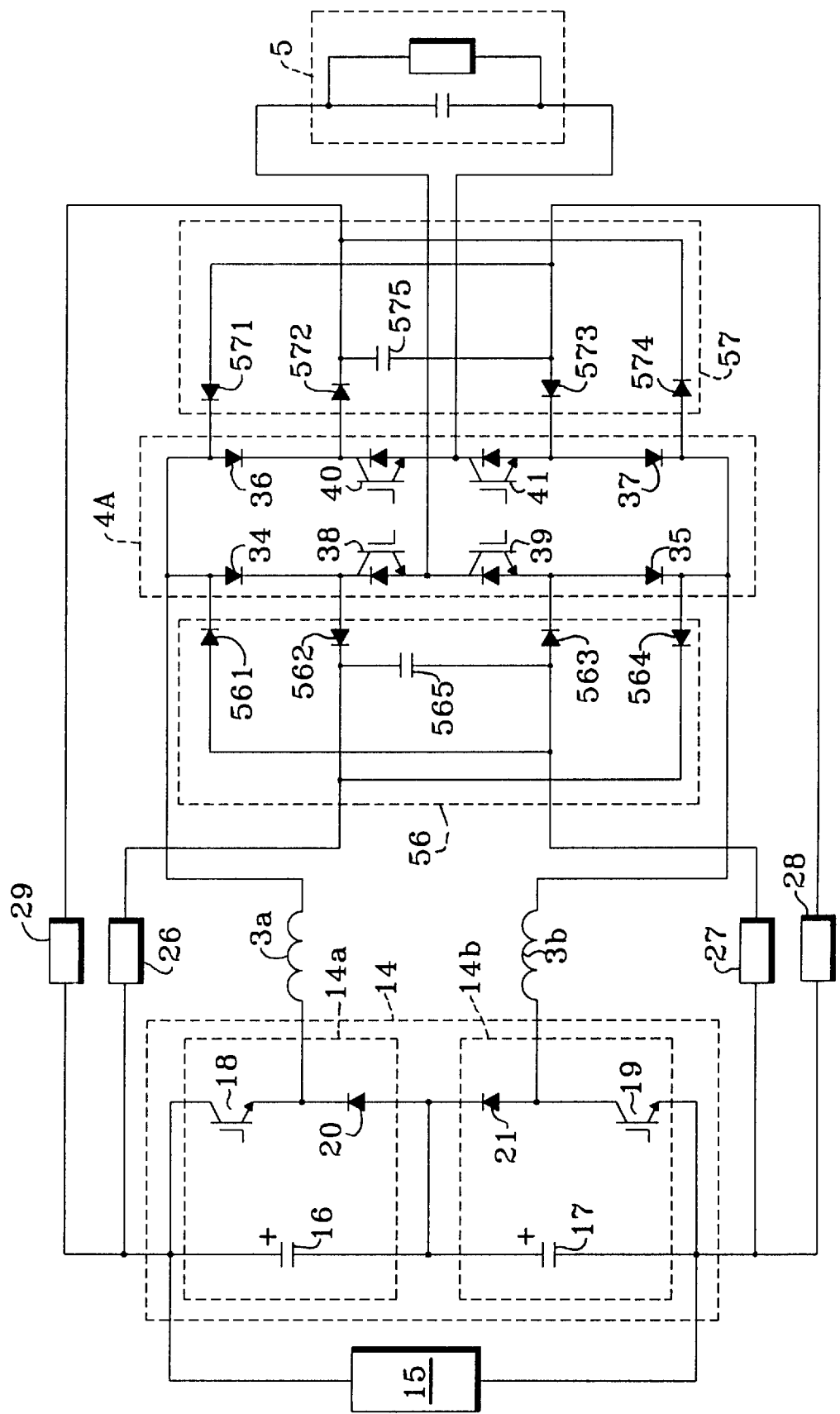
FIG. 7 shows the sixth embodiment of the AC current source circuit according to the present invention.

FIG. 7 shows the sixth embodiment of the AC current source circuit according to the present invention.

The difference of the sixth embodiment from the fifth embodiment resides in the configuration of the snubber circuits 56 and 57 connected to the current-fed inverter 4A. According to the present embodiment, two snubber circuits 56 and 57 which are shared for the upper and lower arms of the inverter are used.

In the present embodiment, as shown in FIG. 7, a snubber circuit 56 comprises diodes 561 through 564 and a capacitor 565, and the ends of the capacitor 565 are connected to the anode of the capacitor 16 and the cathode of the capacitor 17 through the resistors 26 and 27, respectively.

A snubber circuit 57 comprises diodes 571 through 574 and a capacitor 575. The ends of the capacitor 575 are connected to the anode of the capacitor 16 and the cathode of the capacitor 17 through the resistors 29 and 28, respectively.

According to the present embodiment, since the total number of components of the snubber circuits 56 and 57 is much smaller than the total number of components of the snubber circuits 46 through 51 of the fifth embodiment, the system can be made smaller and less expensive.

The configuration of the circuit shown in FIG. 7 is especially effective for a system comparatively small in output capacity, and is recommendable for the case where the connection line inductance components of the semiconductor elements 34 through 41 forming part of the current-fed inverter 4A are small enough to be ignored.

In a system requiring a large output capacity, the inductances of lines between the blocking diodes 34 through 37 and the IGBTs 38 through 41 in the current-fed inverter 4A is not small enough to be ignored, because of the size of each semiconductor and the influence of the L·di/dt from a large current, according to the embodiment shown in FIG. 6 is more practical.

Figure 8:
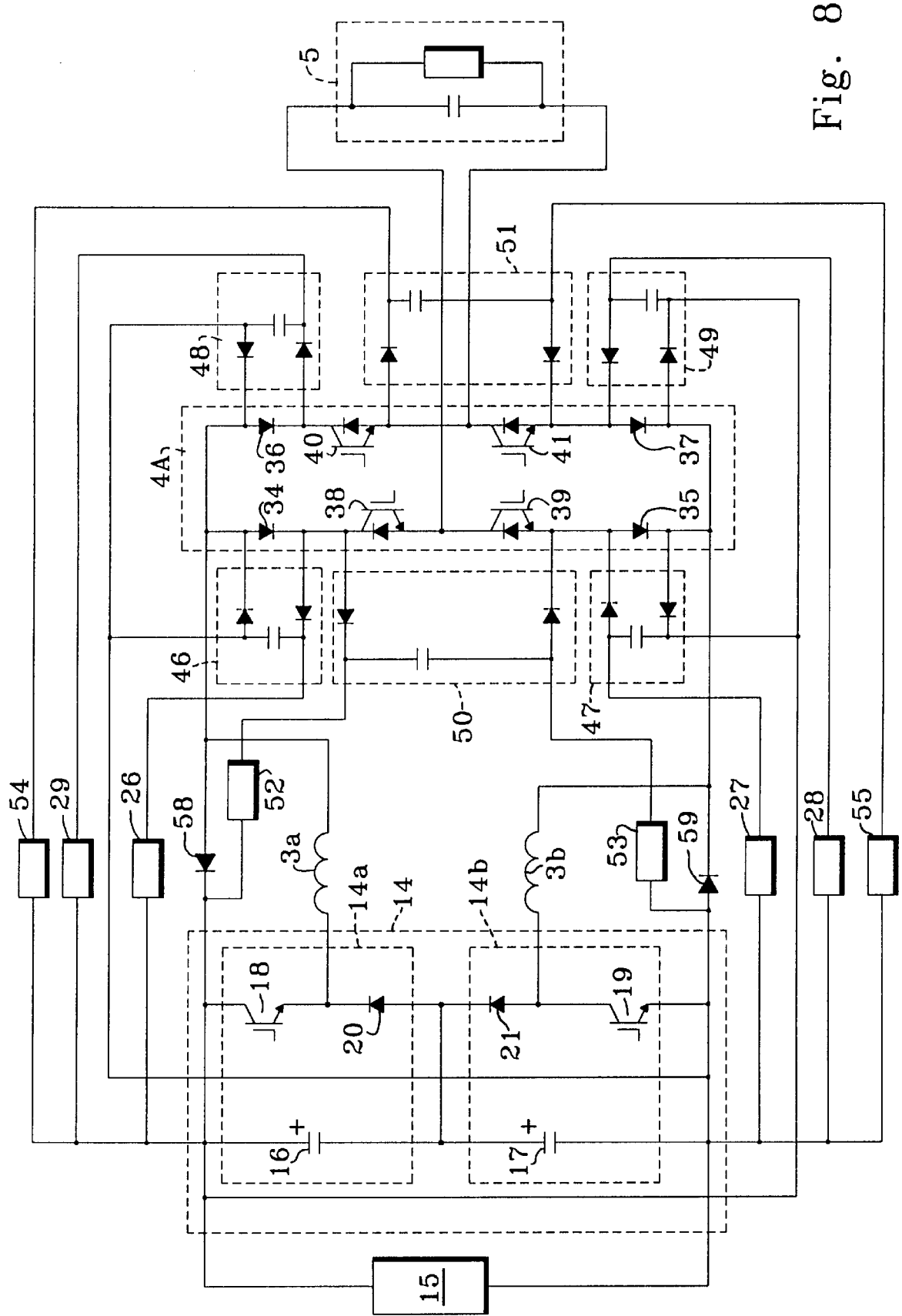
FIG. 8 shows the seventh embodiment of the AC current source circuit according to the present invention.

FIG. 8 shows the seventh embodiment of the AC current source circuit according to the present invention.

The difference of the seventh embodiment from the fifth embodiment is that a diode 58 is connected between the connection point between the DCL 3a and the current-fed inverter 4A and the positive side terminal of the DC power source 15, and that a diode 59 is connected between the connection point between the DCL 3b and the current-fed inverter 4A and the negative side terminal of the DC power source 15.

The function of these diodes 58 and 59 is to directly return the energy stored in the DCLs 3a and 3b to the DC power source 15, or to circulate (free-wheel) the energy through the chopper circuit 14, if the inverter 4A abnormally stopped for any reason during the operation of the system and all of the IGBTs 38 through 41 have been turned off.

In these operations, the excess energy of the DCLs 3a and 3b is prevented from flowing into the snubber circuits 46 through 51. As a result, the snubber circuits 46 through 51 can be small in size and capacity, and can be less expensive.

The above described features of the present embodiment can be applicable to other embodiments.

Figure 9:
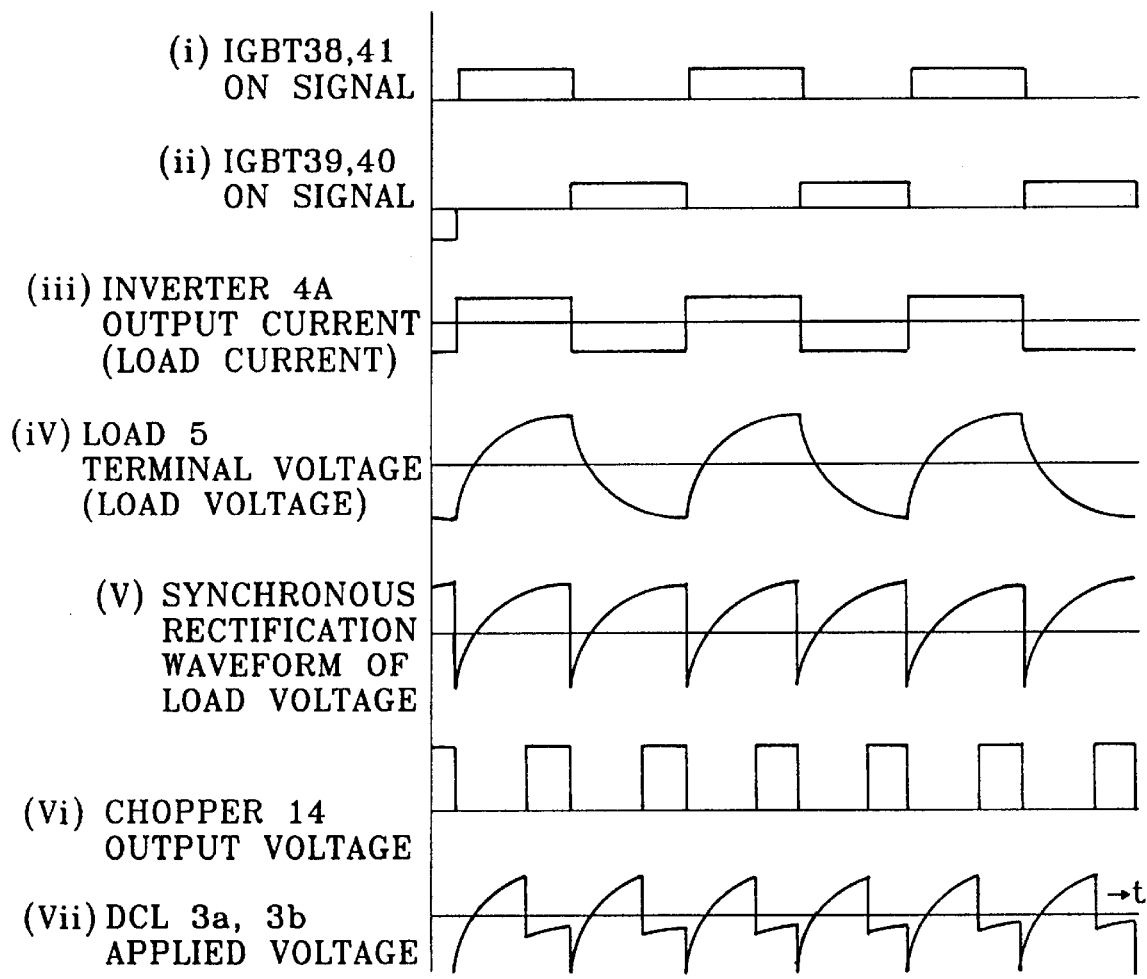
FIG. 9 shows waveforms of currents and voltages in the AC current source circuit according to the present invention.

FIG. 9 shows the waveforms of the currents and voltages in the embodiments of the present invention.

For example, in the fourth embodiment of the present invention shown in FIG. 5, the IGBTs 38 and 41 of the current-fed inverter 4A are turned on and off according to the same signal shown by (i) in FIG. 9, and the IGBTs 39 and 40 are turned on and off according to the same signal shown by (ii) in FIG. 9.

During the above described operations, ignoring the ripple elements of the current flowing through the DCLs 3a and 3b, the output current from the current-fed inverter 4A provided for the capacitive load 5 becomes an AC current of a rectangular waveform as shown in (iii) in FIG. 9. The terminal voltage (load voltage) of the capacitive load 5 generated by the output current has a triangular-like waveform as shown by (iv).

On the other hand, the voltage applied to both ends of the DCLs 3a and 3b is a differential voltage (vii) between the voltage having the waveform (v) obtained by synchronously rectifying a load voltage using an ON signal of the IGBTs 38 through 41 of the current-fed inverter 4A, and the output voltage (vi) from the chopper circuit 14.

If the output frequency of the chopper circuit 14 is double the output frequency of the current-fed inverter 4A, then the voltage applied to both ends of the DCLs 3a and 3b has the same frequency as the voltage obtained by synchronously rectifying the load voltage. Matching both voltages can cancel most of the original frequency components.

As a result, the voltage applied to both ends of the DCLs 3a and 3b (ripple voltage) becomes lower, and the DCLs 3a and 3b can be made smaller and less expensive.

According to all embodiments of the present invention, the switching frequency of the chopper circuit 14 is designed to be double the frequency synchronizing with the output frequency of the current-fed inverter. Further, the generation of a beat signal in the output current of the current-fed inverter and the ripple voltage of a DCL can be suppressed by synchronizing the switching timing in the chopper circuit 14, at which the power mode is switched into the free-wheeling mode, with the timing of commutation in the current-fed inverter 14 or 14A. As a result, the DCL can be smaller and less expensive.

In each of the above described embodiments, a snubber reactor can replace a snubber resistor.

According to the present invention, a discharge rejection type clamping snubber circuit with a small-loss, which has been hard to apply in the conventional current-fed inverter, can be realized with a simple circuit configuration. As a result, the circuit can be made smaller, with high-efficiency and at a low-cost, especially for a high-frequency output device.

Furthermore, the load of a DC reactor can be decreased by a synchronous operation of the chopper circuit and the current-fed inverter, thereby realizing a smaller and less expensive system through the reduction of the current capacity of the DC reactor.

Thus, a small and light-weight AC current source circuit can be realized with a low cost and high productivity.

What is claimed is:

1. An AC current source circuit for converting a DC input voltage into an AC output current, comprising:

a chopper circuit having a pair of input terminals for converting the DC input voltage applied to said input terminals into a chopper voltage;

an inverter including at least four switch elements, for converting the chopper voltage into an output AC current having a predetermined frequency; and a plurality of clamp-type snubber circuits, each of said snubber circuits corresponding to said switch elements, wherein said snubber circuits discharge to said input terminals of said chopper circuit.

2. The AC current source circuit according to claim 1, wherein said chopper circuit comprises two unit chopper circuits connected in series between said input terminals for the DC input voltage;

each of said two unit chopper circuits comprises a capacitor and a switch circuit connected to said capacitor in parallel; and said capacitors of said two unit chopper circuits are connected in series between said input terminals of the DC input voltage.

3. The AC current source circuit according to claim 1, wherein said chopper circuit and said inverter are connected through a DC reactor;

the DC input voltage is converted into a DC current by said chopper circuit and said DC reactor, and said inverter converts the DC current into the output AC current.

4. The AC current source circuit according to claim 3, wherein said inverter is an n-phase full-bridge semiconductor current-fed inverter having 2×n (n indicates an integer equal to or larger than 2) semiconductor switch elements, and converts the DC current from said DC reactor into an AC current of a rectangular-like waveform.

5. The AC current source circuit according to claim 1, wherein said switch elements are reverse blocking type semiconductor switch elements, respectively provided for a plurality of arms of said inverter;

each of said snubber circuits comprises a parallel circuit of a full-bridge diode rectifier and a snubber capacitor; and ends of said snubber capacitor are connected to input terminals of the DC input voltage of said chopper circuit through one of a snubber resistor and a snubber reactor.

6. The AC current source circuit according to claim 1, wherein said switch elements are reverse blocking type semiconductor switch elements, respectively provided for a plurality of arms of said inverter;

each of said snubber circuits comprises a series circuit of a snubber diode, a snubber capacitor, and a snubber diode; and ends of said snubber capacitor are connected to input terminals of the DC input voltage of said chopper circuit through one of a snubber resistor and a snubber reactor.

7. The AC current source circuit according to claim 1, wherein each of said switch elements comprises a series circuit of a semiconductor rectifier element and a self-commutation type semiconductor switch element, and is provided for each of a plurality of arms of said inverter;

each of said snubber circuits comprises first, second, and third snubber diodes and a snubber capacitor;

a connection point of said semiconductor rectifier element and said self-commutation type semiconductor switch element is connected to one end of said snubber capacitor through said first snubber diode;

another end of said snubber capacitor is connected to both ends of said series circuit through said second and third snubber diodes; and ends of said snubber capacitor are connected to input terminals of the DC input voltage of said chopper circuit through one of a snubber resistor and a snubber reactor.

8. The AC current source circuit according to claim 4, wherein each of said switch elements comprises a series circuit of a semiconductor rectifier element and a self-commutation type semiconductor switch element, and is provided for each of a plurality of arms of said inverter;

all of elements in said arms connected to an AC output side of said inverter are semiconductor rectifier elements or self-commutation type semiconductor switch elements;

each of said snubber circuit comprises:

a series circuit, for all elements in said arms connected to said AC output side, of a snubber diode, a snubber capacitor, and a snubber diode; and a series circuit, for each of other elements in said inverter, of a snubber diode, a snubber capacitor, and a snubber diode; and each snubber capacitor of said snubber circuit are connected in parallel to input terminals for the DC input voltage of said chopper circuit through one of a snubber resistor and a snubber reactor.

9. The AC current source circuit according to claim 4, wherein each of said switch elements comprises a series circuit of a semiconductor rectifier element and a self-commutation type semiconductor switch element, and is provided for each of a plurality of arms of said inverter;

all of elements in said arms connected to an AC output side of said inverter are semiconductor rectifier elements or self-commutation type semiconductor switch elements;

said snubber circuit comprises a series circuit, for all elements in said arms connected to said AC output side, of a snubber diode, a snubber capacitor, and a snubber diode;

ends of each snubber capacitor of said snubber circuit are connected in parallel to input terminals for the DC current through a diode; and each ends of said snubber circuit are connected in parallel to input terminals for the DC input voltage of said chopper circuit through snubber resistor or a snubber reactor.

10. The AC current source circuit according to claim 3, wherein an energy regeneration diode for said DC reactor is provided between a positive side input terminal for the DC input voltage of said chopper circuit and a positive side input terminal of said inverter, and between a negative side input terminal for the DC input voltage of said chopper circuit and a negative side input terminal of said inverter.

11. The AC current source circuit according to claim 1, wherein a switching frequency of said chopper circuit is synchronized with an output frequency of said inverter, and is double the output frequency of said inverter.

12. The AC current source circuit according to claim 1, wherein a switching timing in said chopper circuit from a power mode to a free-wheeling mode is synchronized with a timing of commutation in said inverter.

13. The AC current source circuit according to claim 3, wherein said DC reactor comprises a reactor with two windings having a common iron core.

14. An AC current source for converting a DC input voltage into an AC output current, comprising:

chopper means for converting the DC input voltage into a chopper voltage;

reactor means for generating a DC current based on the chopper voltage;

inverter means comprising switching means for converting the DC current from said reactor means into the AC output current; and snubber means of a clamp-type corresponding to said switching means, wherein said snubber means discharges to said chopper means.

\* \* \* \* \*